United States Patent

[11] 3,588,627

| [72] | Inventor | Mark Markarian<br>Williamstown, Mass. |
|---|---|---|
| [21] | Appl. No. | 815,130 |
| [22] | Filed | Apr. 10, 1969 |
| [45] | Patented | June 28, 1971 |
| [73] | Assignee | Sprague Electric Company<br>North Adams, Mass. |

[54] LEADLESS SOLID ELECTROLYTE TANTALUM CAPACITOR
6 Claims, 2 Drawing Figs.

[52] U.S. Cl. .................................................. 317/230,
29/570, 317/234
[51] Int. Cl. .................................................. H01g 9/05
[50] Field of Search............................................ 317/230,
232, 233, 234; 29/570

[56] References Cited
UNITED STATES PATENTS

| 2,923,866 | 2/1960 | Wagner.................... | 317/230 |
| 3,054,029 | 9/1962 | Wagner et al................. | 317/230 |
| 3,196,323 | 7/1965 | Rogers et al.................. | 317/230 |
| 3,243,316 | 3/1966 | O'Nan et al................... | 317/230X |
| 3,277,349 | 10/1966 | Hyland et al................. | 317/230 |
| 3,015,758 | 1/1962 | Hildebrandt et al......... | 317/230 |

*Primary Examiner*—James D. Kallam
*Attorneys*—Connolly and Hutz, Vincent H. Sweeney, James Paul O'Sullivan and David R. Thornton

ABSTRACT: A solid electrolyte tantalum capacitor is provided wherein the wire connection to the tantalum sintered pellet is eliminated. A portion of the pellet is rendered nonporous to anodizing solutions and semiconductor deposition solutions. Following formation of oxide and solid electrolyte deposition, the nonporous area is exposed, reanodized, and reexposed to form a separating margin and the anode connection made directly to this reexposed nonporous area of the pellet.

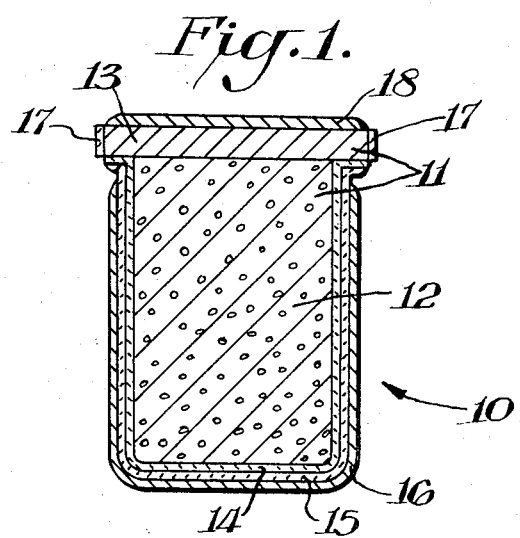
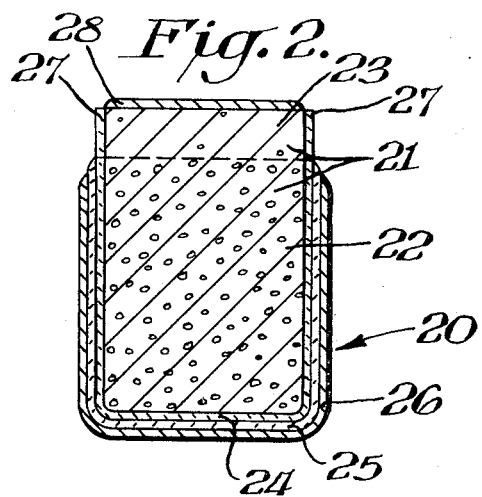

LEADLESS SOLID ELECTROLYTE TANTALUM CAPACITOR

BACKGROUND OF THE INVENTION

This invention relates to solid electrolyte tantalum capacitors and particularly to such a capacitor wherein the conventional riser wire connection to the anode is eliminated.

The above capacitors are finding increasing use in applications wherein extremely high frequency signals (over 0.5 mHz.) are encountered, i.e., digital computers. At these frequencies, the self-inductance of the capacitor creates an inductive reactance which limits capacitor operation at these frequencies. A significant portion of this inductance is created by the lead wires to the capacitor, primarily the anode lead-in wire or riser. This anode connection is especially troublesome since it requires that a tantalum riser be welded or pressed into the anode followed by the welding, the the riser, of the positive wire connection. Attempts to eliminate the riser connections have heretofore been unsuccessful since the sintered body, after anodization and electrolyte deposition, will not accept a direct connection made through the formed oxide and electrolyte layers. Also, the close proximity of raw metal and semiconductor create a condition wherein shorts are impossible to prevent.

It is therefore the object of the present invention to provide a solid electrolyte capacitor whose inductive reactance at high frequencies is greatly reduced.

It is a further object to provide such a capacitor having a novel anode construction which permits direct connection of an external positive lead to the anode after anodization and electrolyte deposition have been completed thereby eliminating the usual riser connection heretofore required.

SUMMARY OF THE INVENTION

Broadly, this invention concerns leadless tantalum capacitors and more particularly, the sintered anode pellet of a solid electrolyte tantalum capacitor which has provided on a portion thereof, a zone of nonporous tantalum to which a direct external lead connection can be made after processing steps are completed.

This nonporous zone can be effected in several ways, i.e., by pressing and sintering together a disc, rectangular plate or cap of tantalum of appropriate thickness in combination with a tantalum powder pellet; by filling the pores of the desired portion of the pellet with a polymeric material, and by superimposing a second powder layer on the pellet surface at a higher pressure than that used during pelletization. All of these methods provide an area on the pellet surface which can be processed along with the pellet body but which, after later exposure, afford a suitable area for external connection.

BRIEF DESCRIPTION OF THE DRAWINGS

FIG. 1 is a sectional view of a solid electrolyte capacitor having a composite anode comprising a porous tantalum pellet and a tantalum plate;

FIG. 2 is another sectional view of the capacitor having a composite anode consisting of a porous section and a relatively nonporous section.

DETAILED DESCRIPTION OF THE INVENTION

Referring to FIG. 1, there is shown a capacitor 10 having a composite anode 11 comprising anode pellet 12 and plate 13. An oxide coating 14 forms the dielectric layer of the capacitor. A coating 15 of a suitable solid electrolyte such as manganese dioxide overlies dielectric layer 14. The cathode contact is provided by applying a silver coating 16 over the electrolyte coating 15. Oxide layer 17, extends around the edge of plate 13. The surface of plate 13 which is devoid of oxide/or electrolyte is covered by conductive silver layer 18. Other means of contacting the bare metallic tantalum such as resistance or parallel gap welding may be used. For ultra high frequency applications bus bars may be thus directly welded to the bare anode area.

Capacitor 10 is formed in the following manner. Composite anode 11 is prepared by pressing and sintering together a tantalum plate 13 of suitable thickness and tantalum pellet 12. Plate 13 is preferably wider than pellet 12 and brims the pellet as shown. A dielectric layer is then formed over the surface of the composite anode followed by deposition of a layer of manganese dioxide. The edges of plate 13 are cleared of oxide and $MnO_2$, either by shearing an appropriate edge portion away or by abrading or sand blasting the edge until the bare tantalum metal is exposed. This action serves to separate oxide layer 14 and manganese dioxide layer 15 from the layers disposed on the surface of plate 13. Another anodization results in formation of oxide layer 17 over the abraded edge of plate 13. The surface of pad 13 is cleared on the remaining oxide and $MnO_2$ from the previous processing by abrasive means which expose the bare tantalum metal. Oxide layer 17 then acts to insulate manganese dioxide layer 15 formed on pellet 12 from the tantalum metal. Layer 18, which is applied to the surface of plate 13, provides an anode termination to which external solder connections can be made. Silver layer 16 can now be applied over the electrolyte coating to serve as the cathode termination.

An alternative embodiment for plate 13 is a nonporous tantalum end cap which fits over one end of the pellet. The end cap is processed in the same manner as plate 13 and likewise affords a contact area on its end surface after abrading away deposited layers of oxide and $MnO_2$.

An alternate embodiment of the invention is shown in FIG. 2. Referring to this FIG., there is shown a capacitor 20 having a composite anode pellet 21 comprising a porous tantalum section 22 and a relatively nonporous tantalum section 23. An oxide coating 24 forms the dielectric layer of the capacitor. A coating 25 of manganese dioxide overlies the dielectric layer and cathode contact layer 26 is formed over coating 25. Oxide layer 27 extends around the edge of section 23 and the surface of section 23 which has been cleared of oxide and electrolyte is covered by conductive silver layer 28.

The capacitor is formed as follows. Anode pellet 21 is a graded density pellet prepared by pressing a thin layer of the pellet (section 23) at a high pressure and then forming porous section 22 at a lower pressure. The pellet is anodized to form a dielectric layer over its surface followed by deposition of a manganese dioxide layer. A portion of the edge of section 23 is abraded away exposing the dense tantalum surface and separating dielectric layer 24 and manganese dioxide layer 25 from the remaining layers on the nonporous surface. The pellet is reanodized with the resulting formation of oxide layer 27 over the abraded edge of section 23. The surface of section 23 is abraded removing the remaining oxide and $MnO_2$ and exposing the bare tantalum. On an ordinary completely porous pellet this abrasive process would cause an electrical breakdown to occur due to the inability of the oxide film to properly insulate the exposed metal from the $MnO_2$ electrolyte. However, because of the dense character of section 23, it is rendered nonporous to the anodizing and $MnO_2$ deposition solutions; hence, the surface presents a stable metal contact area. Layer 28 can then be applied to the surface of section 23 to provide an anode termination to which solder connections can be made. Silver layer 26 is applied over the electrolyte coating to serve as the cathode termination.

Alternatively, nonporous section 23 can be formed by dipping or painting, one end of a porous anode pellet into or with, respectively, a heat-resistant polymeric material capable of withstanding the high temperatures associated with the processing steps. Some suitable polymeric materials are polytetrafluoroethylenes, polyimides, and polybenzimidazoles.

Another suitable anode termination material for the embodiments cited above is nickel or other conductive metals attached to the exposed tantalum plate or section by parallel gap or indirect resistance welding.

Still another termination means is a conductive end cap which can be positioned over both anode and cathode ends of the capacitor. This termination is especially useful for circuit spring clip mountings.

While the preferred embodiment utilizes a tantalum anode, the invention should be understood as not being restricted thereto. The invention is to be considered to include other valve-forming metals such as aluminum, zirconium, and niobium. And while the preferred electrolyte cited is manganese dioxide any of the higher oxides of manganese, lead and nickel can be used as well as the organic semiconductors such as the quaternary ammonium complex salts.

I claim:

1. A solid electrolyte capacitor comprising an anode consisting of a porous and a relatively nonporous valve-metal section; a first dielectric layer formed over the surface of said porous section; a second dielectric layer formed over the surface of said relatively nonporous section covering the perimetrical surface of said anode adjacent the edge of said first dielectric layer; a solid electrolyte overlying said first dielectric layer exclusive of said second dielectric layer, a conductive cathode layer overlying at least a portion of said electrolyte and a conductive terminal area of bare anode metal exposed in an uncovered surface portion of said nonporous section.

2. The capacitor of claim 1 wherein said porous section is a sintered tantalum pellet and said nonporous section is a tantalum member.

3. The capacitor of claim 2 wherein said tantalum member is larger than said pellet and extends beyond the abutting pellet surface.

4. The capacitor of claim 1 wherein said nonporous section comprises a heat-resistant polymeric material filling the pores of a relatively porous valve-metal member.

5. The capacitor of claim 4 wherein the polymeric material is selected from the group consisting of polytetrafluoroethylene, polyimide and polybenzimidazole.

6. The capacitor of claim 1 wherein said nonporous section comprises a denser concentration of tantalum powder pressed at a higher pressure than the porous section.